(12) United States Patent
Voigt et al.

(10) Patent No.: US 8,641,491 B2
(45) Date of Patent: Feb. 4, 2014

(54) ACTUATING DEVICE AND HEATING OR AIR CONDITIONING UNIT

(75) Inventors: Klaus Voigt, Bietigheim-Bissingen (DE); Hilmar Hegner, Winnenden (DE)

(73) Assignee: Behr GmbH & Co. KG, Stuttgart (DE)

( * ) Notice: Subject to any disclaimer, the term of this patent is extended or adjusted under 35 U.S.C. 154(b) by 1354 days.

(21) Appl. No.: 10/585,764

(22) PCT Filed: Dec. 13, 2004

(86) PCT No.: PCT/EP2004/014191
§ 371 (c)(1),
(2), (4) Date: Jul. 2, 2008

(87) PCT Pub. No.: WO2005/068231
PCT Pub. Date: Jul. 28, 2005

(65) Prior Publication Data
US 2008/0254732 A1    Oct. 16, 2008

(30) Foreign Application Priority Data
Jan. 15, 2004   (DE) .......................... 10 2004 002 363

(51) Int. Cl.
*B60H 1/32* (2006.01)
(52) U.S. Cl.
USPC ...................................................... 454/143
(58) Field of Classification Search
USPC ...................................................... 454/143
See application file for complete search history.

(56) References Cited

U.S. PATENT DOCUMENTS

| | | | |
|---|---|---|---|
| 4,656,926 A * | 4/1987 | Bauer et al. | 454/143 |
| 4,767,096 A * | 8/1988 | Bouvot | 251/25 |
| 4,858,518 A | 8/1989 | Yamaguchi et al. | |
| 5,095,948 A | 3/1992 | Arold et al. | |
| 5,700,191 A * | 12/1997 | Nieling et al. | 454/69 |
| 5,890,958 A * | 4/1999 | Greiner et al. | 454/155 |
| 6,129,627 A * | 10/2000 | Jankowski et al. | 454/155 |
| 6,189,801 B1 * | 2/2001 | Klingler et al. | 237/12.3 B |
| 6,425,437 B2 * | 7/2002 | Schmadl et al. | 165/42 |
| 6,427,760 B2 * | 8/2002 | Klinger et al. | 165/42 |
| 6,651,453 B2 * | 11/2003 | Klingler et al. | 62/244 |
| 2002/0068520 A1 | 6/2002 | Ro | |

FOREIGN PATENT DOCUMENTS

| | | |
|---|---|---|
| DE | 1 575 592 | 10/1970 |
| DE | 90 05 778 U1 | 4/1991 |
| DE | 39 36 776 C1 | 5/1991 |
| DE | 195 48 246 A1 | 6/1997 |
| DE | 197 04 412 | 5/1998 |
| DE | 103 01 156 B3 | 9/2004 |
| EP | 1 213 165 A2 | 6/2002 |
| FR | 1 586 367 | 2/1970 |
| FR | 2 778 149 A1 | 11/1999 |
| GB | 1 352 355 | 5/1974 |
| JP | 11-321282 A | 11/1990 |
| JP | 2002-002259 A | 1/2002 |

* cited by examiner

*Primary Examiner* — Steven B McAllister
*Assistant Examiner* — Samantha Miller
(74) *Attorney, Agent, or Firm* — Foley & Lardner LLP

(57) ABSTRACT

The invention relates to an actuating device comprising an operating control for positioning actuating elements, in particular in a heating or air conditioning unit and to a heating or air conditioning unit, in particular of a motor vehicle, comprising an actuating device.

11 Claims, 4 Drawing Sheets

ACTUATING DEVICE AND HEATING OR AIR CONDITIONING UNIT

The present invention relates to an actuating device for setting at least two actuating elements and to a heating or air conditioning unit with an actuating device of this type.

In the case of heating or air conditioning systems, in particular in motor vehicles, a desired temperature level of the air blown into a motor vehicle interior is usually set by hot and cold air being mixed in the interior of a housing of the heating or air conditioning unit and the mixture being blown out of outlets of the system. The mixing ratio and therefore the temperature is controlled, like the distribution of air to various outlets, by means of air flow control elements, for example one or more flaps which open or block the air-guiding ducts to a desired extent.

An air flow control element of this type is set by the operating element of an operating unit by means of an actuating device, with the movements of the operating element being transmitted to the air flow control element, for example by means of a flexible shaft.

In addition to a certain temperature level and a distribution of the air-conditioned air to different regions of the passenger compartment, more recent concepts of air conditioning also provide the possibility of selecting the type of flow of the air-conditioned air, in particular in order to increase the vehicle occupants' sensation of comfort. The passenger can set individual air vents or nozzles in such a manner that the air blown into the vehicle interior is conditioned in the form of an intensely directed flow, a diffuse flow or else as a mixture of these two types of flow.

It is prior art to set the distribution of the air-conditioned air in the interior, for example by means of a rotary switch or slide switch on the operating unit of the air conditioning system. The selection of the type of flow is set directly at the air vent or at the nozzle, for example via a selection wheel or a slide.

It is the object of the invention to provide an actuating device and a heating or air conditioning unit with an actuating device, in which both the distribution of air and the discharge of air can be set via an individual operating element.

This object is achieved by an actuating device with the features of claim 1 and by a heating and/or air conditioning system with the features of claim 13.

According to claim 1, an actuating device according to the invention, for setting or adjusting at least one actuating element of at least one air vent and at least one actuating element of at least one air flow control element in at least one air-guiding duct in a housing of a heating or air conditioning unit of a motor vehicle, comprises an operating unit having at least one operating element and at least two elements for transmitting the movements of the at least one operating element of the operating unit to the actuating elements. The operating element of the operating unit is preferably designed as a rotary switch or slide switch.

The movement or change in position of at least one operating element is transmitted via at least two transmission elements, preferably Bowden cables or flexible shafts, to at least one actuating element of at least one air vent and to at least one actuating element of at least one air flow control element. In this case, the operating element on the operating unit has two setting ranges which are independent of each other.

In a first setting range, the movement or the changing of the position of the operating element is transmitted to at least one actuating element of at least one air vent. In a second setting range, the movement or the changing of the position of the operating element is transmitted to at least one adjusting element of at least one air flow control element. The two setting ranges are independent of each other, that is to say either at least one actuating element of at least one air vent or at least one actuating element of at least one air flow control element can be adjusted.

In a first setting range, the operating element on the operating unit can be adjusted from a first end position "diffuse" via intermediate positions to a second end position "spot". The transmission of this setting to at least one actuating element of at least one air vent leads to an adjustment of the at least one air vent, in which the latter, in accordance with the "diffuse" setting, introduces diffuse air into the interior and, in accordance with the "spot" setting, introduces directed air or a spot flow into the interior. In the intermediate positions, a mixture of diffuse and directed air flow, which mixture corresponds to the position of the operating element, is introduced into the interior. The air vents used in this case are preferably swirl nozzles with which this variation of the flow characteristic of the air can be achieved.

In a second setting range, the operating element on the operating unit can be adjusted from a first end position "defrost" via intermediate positions to a second end position "foot well". The transmission to the at least one actuating element of at least one air flow control element brings about an adjustment of the at least one air flow control element, in which the latter, in accordance with the "defrost" setting, ensures that the windshield is ventilated and, in accordance with the "foot well" setting, ensures that the foot well is ventilated. In the intermediate positions, a mixture of windshield and foot well ventilation, which mixture corresponds to the setting of the operating element, is obtained.

It is essential for the invention that the two setting possibilities described can be realized by means of an individual operating element on the operating unit. According to a preferred embodiment of the actuating device according to the invention, the response behavior and activation behavior, which are independent of each other, of the actuating elements in the two separate setting ranges is brought about by a cam disk with at least two different radial cams. The operating element is connected rigidly to a cam disk. A respective radial cam for controlling the separate movement of the movement transmission elements, such as, for example, the Bowden cables or flexible shafts for the two different setting ranges, is preferably situated in each case on the front side and the rear side of the cam disk. In an advantageous embodiment of the actuating device according to the invention, this control can also take place via at least two cam disks each having at least one radial cam.

According to a preferred development of the actuating device according to the invention, at least one actuating element of at least one air vent and/or of one air flow control element can be driven by an electric motor as actuator. The setting or adjustment movement of the operating element on the operating unit can preferably be detected via an electronic position sensor and can be transmitted via electric lines to at least one electric motor of an actuating element.

Since the construction space in the region of an air vent or an air flow control element may be very limited, the drive motors may also be combined in a central motor unit which is situated, for example, on the housing of the air conditioning unit or at any desired location, depending on the available construction space, and from there uses transmission elements, such as, for example, Bowden cables or flexible shafts, to move the corresponding actuating elements.

According to a preferred development, the actuating device according to the invention is used in a heating or air conditioning unit which comprises at least one of the following components: heat exchanger, heating element, evaporator, filter, temperature mixing flap, mixing chamber, one or more flow ducts and one or more control flaps for distributing the air to the outlet ducts.

The invention is explained in more detail below using exemplary embodiments with reference to the drawings, in which.

Figure 1:
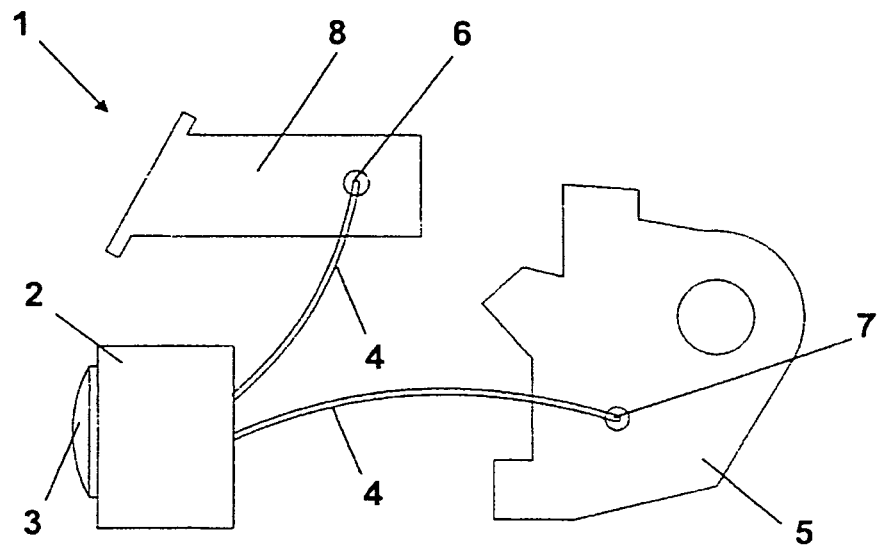
FIG. 1 shows a diagrammatic view of an actuating device for setting actuating elements according to the present invention.

FIG. 1 diagrammatically illustrates a preferred embodiment of an actuating device 1 for setting or adjusting an actuating element 6 of an air vent 8 and a second actuating element 7 of an air flow control element 14 in at least one air-guiding duct 15 in a housing of a heating or air conditioning unit 5 of a motor vehicle 18, and an operating unit 2 with an operating element 3 and a respective element for transmitting 4 the movements of the operating element 3 of the operating unit 2 to the actuating elements 6 and according to the present invention. The air flow control element and the air-guiding ducts are situated in the housing of the heating or air conditioning unit 5.

The elements for transmitting 4 the position or changing position of the operating element 3 to the actuating element 6 of the air vent 8 and to the actuating element 7 of the air flow control element are designed in the form of Bowden cables or flexible shafts.

Figure 2:
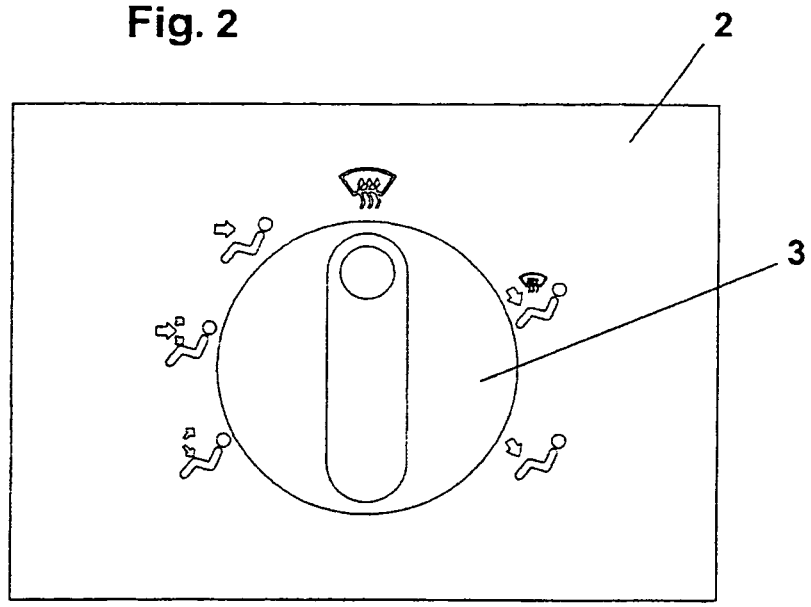
FIG. 2 shows a diagrammatic view of an operating unit with an operating element according to the present invention.

FIG. 2 shows, in a diagrammatic illustration, a view of an operating unit 2 with an operating element 3 which is designed as a rotary switch. The operating element has two separate setting ranges, the function and operation of which are explained below.

In a first setting range (left-hand side in FIG. 2), the movement or the changing of the position of the operating element 3 is transmitted to the actuating element 6 of the air vent 8.

In a second setting range (right-hand side in FIG. 2), the movement or the changing of the position of the operating element 3 is transmitted to the adjusting element 7 of the air flow control element. The two setting ranges are independent of each other, that is to say either the actuating element 6 of the air vent 8 or the actuating element 7 of the air flow control element can be adjusted.

In the first setting range, the operating element 3 on the operating unit 2 can be adjusted from a "diffuse" position (bottom left in FIG. 2) via intermediate positions to a "spot" position (top left in FIG. 2). The two end positions "diffuse" and "spot" and an intermediate position in between are illustrated by way of symbolic depictions on the operating unit 2.

The transmission of the adjustment movement of the operating element 3 to the actuating element 6 of the air vent 8 leads to an adjustment of the air vent 8. In accordance with the "diffuse" setting, the air vent 8 is set by the actuating element 6 in such a manner that the air which is conducted into the vehicle interior 19 has a diffuse flow characteristic. In accordance with the "spot" setting, the air vent 8 is set by the actuating element 6 in such a manner that the air which is conducted into the vehicle interior has a directed or spot-shaped flow characteristic. In the region in between, depending in each case on the setting of the operating element 3, a corresponding mixture of diffuse and directed air flow is blown into the interior. For the air vent 8 here use is preferably made of swirl nozzles with which the described variation of the flow characteristic can be achieved.

In the second setting range, the operating element 3 on the operating unit 2 can be adjusted from a "defrost" position (top center in FIG. 2) via intermediate positions to a "foot well" position (bottom right in FIG. 2). The two end positions "defrost" and "foot well" and an intermediate position in between are likewise illustrated by way of symbolic depictions on the operating unit 2.

The transmission of the adjustment movement of the operating element 3 to the actuating element 7 of the air flow control element leads to an adjustment of the air flow control element. In accordance with the "defrost" setting, the air flow control element is set by the actuating element 7 in such a manner that the vehicle windshield is ventilated to maximum extent. In accordance with the "foot well" setting, the air flow control element is set by the actuating element 7 in such a manner that the vehicle foot well is ventilated to maximum extent. In the region in between, depending in each case on the setting of the operating element 3, a corresponding mixture of windshield and foot well ventilation is obtained.

It is essential for the invention that these two setting possibilities can be realized by means of an individual operating element 3 on the operating unit 2.

Figure 3:
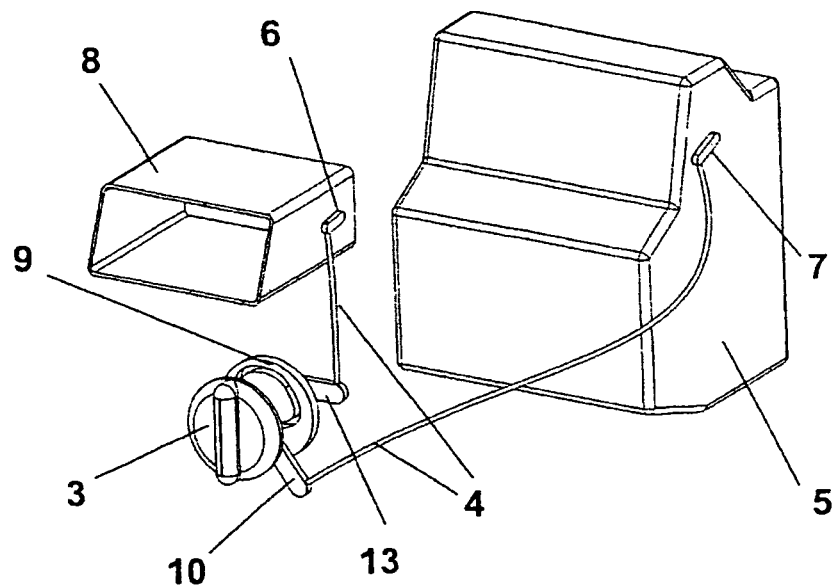
FIG. 3 shows a diagrammatic view of an arrangement according to the invention for transmitting the movement of an operating element to the actuating elements.

According to a preferred embodiment of the actuating device 1 according to the invention, the different response behavior and activation behavior of the actuating elements 6 and 7 in the two separate setting ranges is obtained, as illustrated in FIG. 3, by a cam disk 9 with two different radial cams. A respective radial cam for controlling the independent movement of the two movement transmission elements 4, for example of the Bowden cables or flexible shafts, for the two different setting ranges is situated in each case on the front side and rear side of the cam disk 9. A pin (not illustrated in FIG. 3) is situated on a lever 13, which is connected to the transmission element 4 for adjusting the actuating element 6 at the air vent 8, which pin engages in the radial cam on the rear side of the control disk 9 and is guided by it. Similarly, a pin (not illustrated in FIG. 3) is situated on the lever 10, which is connected to the transmission element 4 for adjusting the actuating element 7 of the air flow control element, which pin engages in the radial cam on the front side of the control disk 9 and is guided by it. The movement of the levers 13 and 10 and, as a result, of the actuating elements 6 and 7 is therefore dependent on the trajectory of the radial cam. While the lever 13 or the actuating element 6 moves, the other lever 10 or the other actuating element 7 can therefore be at rest, and vice versa.

Figure 4:
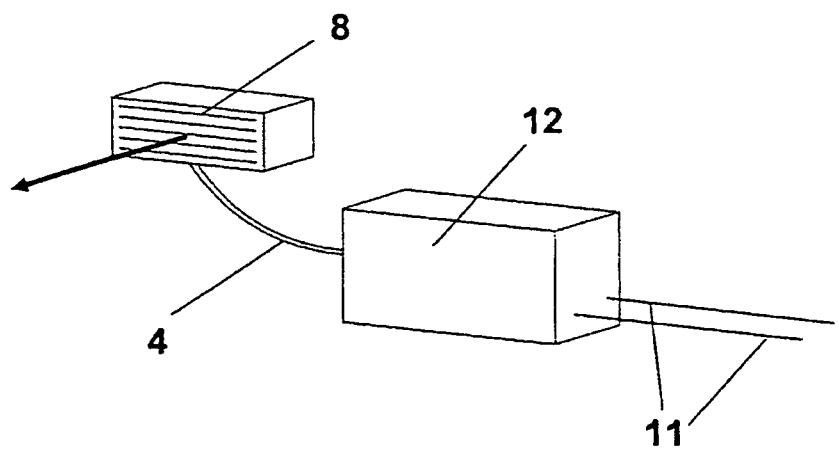
FIG. 4 shows a diagrammatic view of an arrangement according to the invention for realizing a central motor unit.
Figure 5:
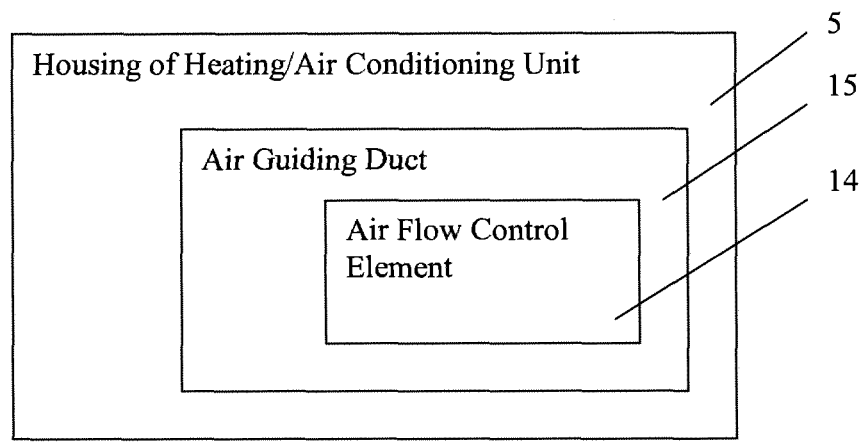
FIG. 5 shows a diagrammatic view of a heating/air conditioning unit with an air guiding duct having an air flow control element.
Figure 6:
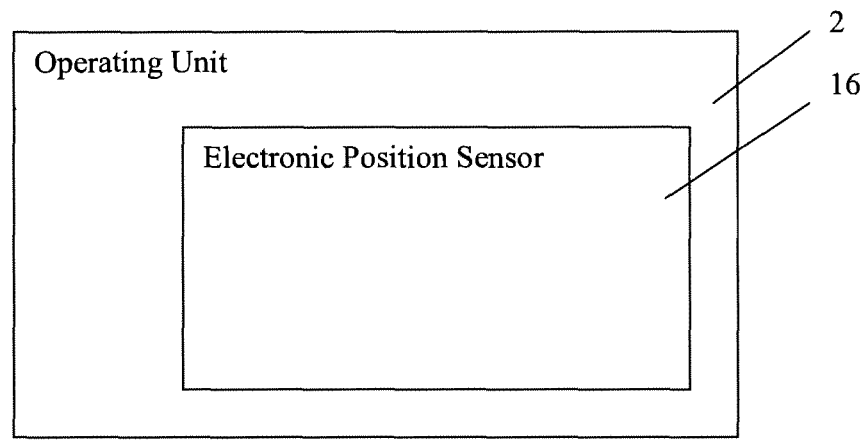
FIG. 6 shows a diagrammatic view of an operating unit with an electronic position sensor.
Figure 7:
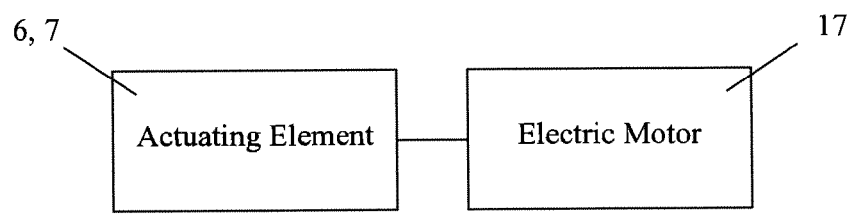
FIG. 7 shows a diagrammatic view of an actuating element connected to an electric motor.
Figure 8:
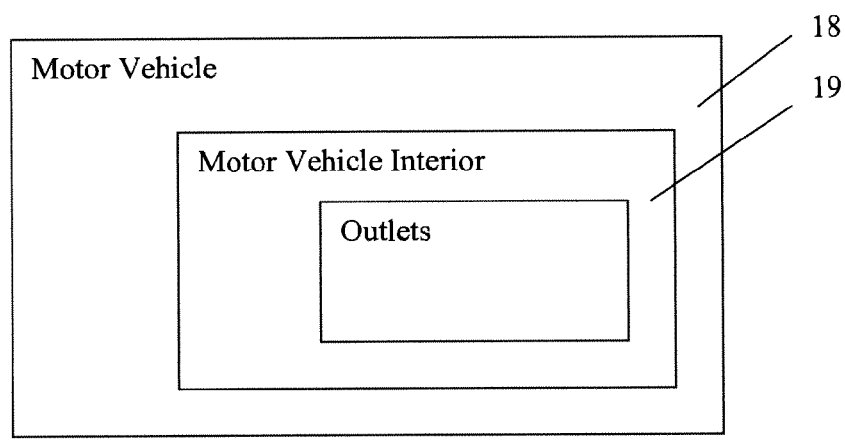
FIG. 8 shows a diagrammatic view of a motor vehicle having a vehicle interior with outlets.

According to a preferred development of the actuating device 1 according to the invention, the actuating elements 6 and 7 can be driven by actuators, in particular by electric motors 17. The setting or adjustment movement of the operating element 3 on the operating unit 2 can preferably be detected via an electronic position sensor 16 and can be transmitted to the electric motors of the actuating elements via electric lines. As illustrated diagrammatically in FIG. 4, in an advantageous variant of the actuating device 1 according to the invention, the motors for driving the actuating elements 6 and 7 are combined in a central motor unit 12, which can be situated, for example, on the housing of the heating or air conditioning unit 5 or at any desired location, depending on the available construction space, and from there use transmission elements 4, such as, for example, Bowden cables or flexible shafts, to move the corresponding actuating elements 6 and 7.

LIST OF DESIGNATIONS

1 Actuating device
2 Operating unit
3 Operating element
4 Transmission element
5 Heating or air conditioning unit
6 Actuating element—air vent
7 Actuating element—air control element
8 Air vent
9 Cam disk
10 Lever—air control element
11 Electric line
12 Central motor unit
13 Lever—air vent
14 Air Flow Control Element
15 Air Guiding Duct
16 Electronic Position Sensor
17 Electric Motor
18 Motor Vehicle
19 Vehicle Interior

The invention claimed is:

1. An actuating device for a motor vehicle, the actuating device comprising:
    an operating unit comprising an operating element that is placable within a first setting range or a second setting range during use of the actuating device;
    an air vent comprising a first actuating element, the air vent being selectively configurable between at least (i) a first configuration, in which air provided to an interior of the motor vehicle is conditioned in a form of an intensely directed flow, (ii) a second configuration, in which air provided to the interior of the motor vehicle is conditioned in a form of a diffuse flow, and (iii) a third configuration, in which air provided to the interior of the motor vehicle is conditioned in a form of a mixture of the intensely directed flow and the diffuse flow;
    an air flow control element comprising a second actuating element, the air flow control element being configured to control a distribution of the air to a plurality of outlets in the interior of the motor vehicle during use of the actuating device;
    a first transmission element connecting the operating unit to the air vent; and
    a second transmission element connecting the operating unit to the air flow control element;
    wherein, when the operating element is placed within the first setting range, the operating unit is configured to control the air vent via the first transmission element and the first actuating element during use of the actuating device, the first setting range including a plurality of positions that are selectable to control whether the air vent is in the first configuration, the second configuration, and the third configuration;
    wherein, when the operating element is placed within the second setting range, the operating unit is configured to control the air flow control element via the second transmission element and the second actuating element during use of the actuating device, the second setting range including a plurality of positions that are selectable to control which of the plurality of outlets the air is distributed to.

2. The actuating device of claim 1, wherein:
    the first setting range comprises a first end position, a second end position, and an intermediate position,
    when the operating element is placed in the first end position, the operating unit is configured to control the air vent such that the air provided to the vehicle interior is conditioned in the form of the diffuse flow,
    when the operating element is placed in the second end position, the operating unit is configured to control the air vent such that the air provided to the vehicle interior is conditioned in the form of the intensely directed flow, and
    when the operating element is placed in the intermediate position, the operating unit is configured to control the air vent such that the air provided to the vehicle interior is the mixture of the diffuse flow and the intensely directed flow.

3. The actuating device of claim 1, wherein:
    the second setting range comprises a first end position, a second end position, and an intermediate position,
    when the operating element is placed in the first end position, the operating unit is configured to control the air flow control element such that the air is distributed to a windshield of the motor vehicle,
    when the operating element is placed in the second end position, the operating unit is configured to control the air flow control element such that the air is distributed to a foot well of the motor vehicle,
    when the operating element is placed in the intermediate position, the operating unit is configured to control the air flow control element such that the air is distributed to both the windshield of the motor vehicle and the foot well of the motor vehicle.

4. The actuating device of claim 1, wherein the operating element of the operating unit is a rotary switch.

5. The actuating device of claim 1, wherein each of the first and second transmission elements is one of a Bowden cable and a flexible shaft.

6. The actuating device of claim 1, wherein the operating unit comprises a control disk with two levers.

7. The actuating device of claim 1, wherein the operating unit comprises two control disks, each control disk comprising one lever.

8. The actuating device of claim 1, wherein at least one of the first actuating element and the second actuating element is driven by an actuator.

9. The actuating device of claim 8, wherein the actuator is an electric motor.

10. The actuating device of claim 8, wherein the operating unit further comprises an electronic position sensor, and the actuating device further comprises an electric line connecting the electronic position sensor to the actuator.

11. The actuating device of claim 1, wherein:
    the first actuating element is driven by a first actuator,
    the second actuating element is drive by a second actuator, and
    the first and second actuators are combined in a central unit.

* * * * *